UNITED STATES PATENT OFFICE.

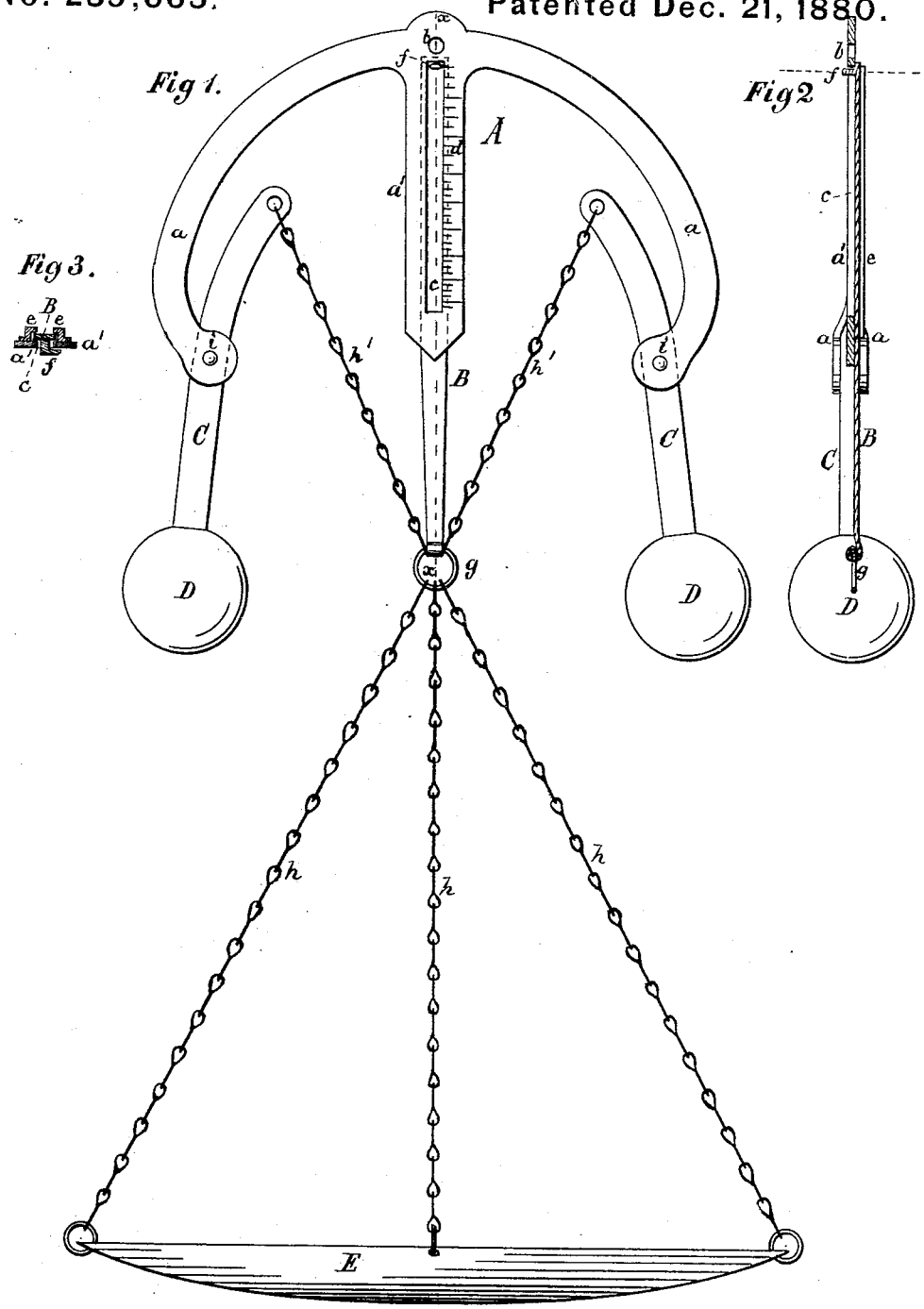

JOHN B. ATWATER, OF GENEVA, ILLINOIS.

PENDULUM-SCALE.

SPECIFICATION forming part of Letters Patent No. 235,663, dated December 21, 1880.

Application filed July 16, 1880. (Model.)

*To all whom it may concern:*

Be it known that I, JOHN B. ATWATER, of Geneva, in the county of Kane and State of Illinois, have invented a new and useful Improvement in Weighing-Scales; and I do hereby declare that the following is a full, clear, and exact description of the same, reference being had to the accompanying drawings, forming part of this specification, in which—

Figure 1 is a front elevation of my improved weighing-scale, and Fig. 2 is a vertical central section of the same in the line $x\ x$, Fig. 1, the tray and its suspenders being removed. Fig. 3 is a horizontal detail section of the bracket and indicator-slide.

The object of my invention is to provide a weighing-scale which operates by means of the gravity of weights acting against the articles being weighed, instead of by means of springs acting against such articles.

The nature of my invention consists in a weighing tray or platform suspended centrally between levers equally weighted at one of their ends, and also attached to said arms or levers and to an indicating-slide, the indicator of which operates in conjunction with a scale-bar and indicates the quantity weighed in the tray or on the platform.

By my invention the tray or platform is always kept in the center by the action of gravity, whether the articles being weighed are placed either to the right or left of the center of the tray, and thus it is impossible for the salesman to defraud the buyer by throwing the articles being weighed on one or the other side of the center of the support of the tray; and, while this is the case, my scale has none of the disadvantages experienced in the use of springs as a resistance to the articles weighed, inasmuch as weights which do not vary in their capacity to weigh the same given quantity at all times are employed as the resisting agents.

It is well known that spring-balances are constantly changing with respect to their accuracy in weighing articles, this change being due to the weakening of the spring during its use for a certain length of time.

Another objection results from the spring offering a greater or less resistance to the weight of the articles placed on the tray or platform, accordingly as it is drawn upon to a greater or less extent; and, further, with scales employing weights, and which are not kept central by the gravity of the articles being weighed, there is a greater opportunity for the salesman to defraud the buyer by moving the articles being weighed to one side of the center of the support.

A in the accompanying drawings represents a portable bracket, consisting of two curved arms, $a\ a$, and a vertical straight body portion, $a'$. At the point where the two arms $a\ a$ unite with the central portion, $a'$, a hole, $b$, is made, in order that the bracket may be hung upon a suitable hook or support. The central portion, $a'$, of the bracket is provided with an oblong rectangular slot, $c$, and on the front surface and at one side of the slot a graduated scale-bar is marked, as indicated at $d$. On the rear surface of the central portion, $a'$, two angular bars, $e\ e$, are fastened, one on each side of the slot $c$, and by this means a guideway for an indicator-slide, B, is formed. The said indicator-slide is provided with a pointer or indicator, $f$, on its front side, and, while the slide fits between the bars $e\ e$ on the back of the bracket A, the pointer passes through the slot and extends over the face of the scaled side of the portion $a'$, as shown in the drawings. Thus the slide is guided and its pointer kept in the slot $c$, the terminations of the slot at top and bottom determining the extent of movement of the pointer.

The slide B extends down below the bottom of the portion $a'$ of the bracket and unites with a ring, $g$, to which cords or chains $h$, having a weighing tray or platform, E, attached to it, are loosely linked, as shown.

To each of the curved arms of the bracket A a lever, C, is pivoted, as shown at $i\ i$, and on the lower end of each lever a ball or weight, D, is fastened. The upper end of each lever C is connected by means of a chain or cord, $h'$, to the ring $g$ of the indicator-slide by means of links which are free to move in the ring. The weight of the respective levers is the same on both sides of the indicator-slide, and the tray E is suspended centrally between the two weights or balls of the levers.

In using the scale for weighing, the articles (sugar, coffee, or other substances) are placed in the tray, and by the gravity of the same the tray is caused to descend in a central position with respect to the weights D D, and as the tray descends the weights D D rise and the indicator-slide descends and its pointer moves over the graduation-marks of the scale-bar and indicates the quantity in the tray. When the articles are removed the levers, with their balls or weights, assume their normal positions, and in moving return all the other parts which are movable to their normal positions.

The scale described is made at a very small cost as compared with the spring-balance, and its weighing capacity with respect to accuracy will, I believe, be found superior to any spring-balance heretofore contrived.

What I claim is—

The combination of the bracket A, provided with an oblong slot and a scale-bar, the equally-weighted levers C C, an indicator-slide, B, with pointer attached, a weighing tray or platform, E, and chains or cords $h$ $h'$, connecting the parts together, substantially as and for the purpose described.

Witness my hand this 12th day of August, A. D. 1879, in the matter of my application for a patent on weighing-scales.

JOHN B. ATWATER.

Witnesses:
P. F. WARD,
B. C. WARD.